US007047532B1

(12) United States Patent
Connelly

(10) Patent No.: US 7,047,532 B1
(45) Date of Patent: May 16, 2006

(54) APPLICATION INDEPENDENT MESSAGING SYSTEM

(75) Inventor: Thomas Connelly, Wantagh, NY (US)

(73) Assignee: The Chase Manhattan Bank, New York, NY (US)

( * ) Notice: Subject to any disclaimer, the term of this patent is extended or adjusted under 35 U.S.C. 154(b) by 0 days.

(21) Appl. No.: 09/409,300

(22) Filed: Sep. 29, 1999

Related U.S. Application Data

(60) Provisional application No. 60/108,285, filed on Nov. 13, 1998.

(51) Int. Cl.
G06F 15/163 (2006.01)

(52) U.S. Cl. .................................................... 719/310
(58) Field of Classification Search ............... 709/310; 719/310
See application file for complete search history.

(56) References Cited

U.S. PATENT DOCUMENTS

| 5,212,792 | A | * | 5/1993 | Gerety et al. ............... 717/100 |
| 5,504,898 | A | | 4/1996 | Klein |
| 5,615,359 | A | | 3/1997 | Yung |
| 5,754,856 | A | | 5/1998 | Klein |
| 5,781,703 | A | | 7/1998 | Desai et al. |
| 5,809,238 | A | | 9/1998 | Greenblatt et al. |
| 5,826,023 | A | * | 10/1998 | Hall et al. .................. 709/206 |
| 5,835,763 | A | | 11/1998 | Klein |
| 5,848,234 | A | | 12/1998 | Chernick et al. |
| 5,883,948 | A | * | 3/1999 | Dunn .................... 379/221.09 |
| 6,470,357 | B1 | * | 10/2002 | Garcia et al. ............... 707/200 |

FOREIGN PATENT DOCUMENTS

| JP | 7-131502 | 5/1995 |
| JP | 10187467 | 7/1998 |

OTHER PUBLICATIONS

IBM, Shared directory, Aug. 1971.*
Toshiba, Information processor e.g. personal computer (PC) has messge display unit which display message stored in help table corresponding to indicated button, when event process unit detectd that there is indication to button seclected to eoverride, 1997.*
Fukatsu, Sadao, Communication system between process, Sep. 4, 1987. Ota, Michihiko, Message communication system, Sep. 4, 1987.*
Hitachi, Track circuit system used in train detector and train operation control system-has controller that detects location of train based on input signals of transceivers arranger on every area unit predetermined track, Sep., 9, 1997.*

(Continued)

Primary Examiner—Meng-Al T. An
Assistant Examiner—LeChi Truong
(74) Attorney, Agent, or Firm—Hunton & Williams LLP

(57) ABSTRACT

A messaging system that isolates application programs from the underlying transport and routing mechanisms that are actually used to convey messages. This isolation is provided in part through the use of directory files. The directory files contain all of the specific details (e.g. conversion and routing parameters) necessary to interface with the transport and routing mechanisms. As the transport and routing details change (e.g. due to updated versions or new mechanisms) only the directory files need to be changed. The present invention further includes Message Processing Servers (MPSs) which provide additional messaging functionality such as message storage, tracing, reconciliation, statistical auditing, reformatting, content based routing and multicasting. As additional functionality is developed, this functionality can be flexibly incorporated into a new MPS.

74 Claims, 9 Drawing Sheets

OTHER PUBLICATIONS

FS, The Workflow Application Architecture, 1999.*

Metzler, S.D., et al., "Distributed Histogramming with CORBA", California Institute of Technology, Abstract 9 pgs.; and.

"Leading Solutions for Enterprise Application Integration" The (Extended) Roma Family, 21 pgs.

Japanese Office Action dated Jun. 17, 1993 (w/ English translation).

* cited by examiner

| | 314 | 318 | 319 | |
|---|---|---|---|---|
| SUBSYSTEM ID | | IS2000 | IS2000 | BYTE SIZE & TYPE |
| PROCESS ID — 316 | | TRADE_UPDATE | TRADE_UPDATE | 8 CHARACTER |
| SERVICE IDENTIFIER — 312 | | SEND TRADE | DEFAULT_PUT | 8 CHARACTER |
| | | | | 20 CHARACTER |
| TRANSPORT METHOD | | MQSERIES | MQSERIES | 20 CHARACTER |
| RESEND ARCHIVE FLAG | | Y | Y | 1 CHARACTER |
| TRACE FLAG | | Y | Y | 1 CHARACTER |
| REPLY TO SERVICE | | IS2K.REPLY | IS2K.REPLY | 20 CHARACTER |
| REPLY TO SUBSYSTEM | | IS2000 | IS2000 | 8 CHARACTER |
| REPLY TO PROCESS | | TRADE_UPDATE | TRADE_UPDATE | 8 CHARACTER |
| LOCAL QM | | NYUAI551 | NYUAI551 | 48 CHARACTER |
| DESTINATION QM | | NYTAI550 | NU11 | 48 CHARACTER |
| DESTINATION Q | | NEON.IN | MVS.TRADEQ | 48 CHARACTER |
| DEST Q OPEN OPTION | | REMOTE Q=2 | REMOTE Q=2 | 1 DECIMAL |
| ARCHIVE QM | | NYUAI551 | ARCHIVE.QM | 48 CHARACTER |
| ARCHIVE Q | | IS2000.ARCH | IS2000.ARCH | 48 CHARACTER |
| ARCHIVE Q OPEN OPTION | | LOCAL Q=1 | REMOTE Q=2 | 1 DECIMAL |
| TRACE QM | | RECON.QM | RECON.QM | 48 CHARACTER |
| TRACE Q | | TRACE.Q | TRACE.Q | 48 CHARACTER |
| TRACET Q OPEN OPTION | | REMOTE Q=2 | REMOTE Q=2 | 1 DECIMAL |
| AUDIT FLAG (NU) | | N | N | 1 CHARACTER |
| AUDIT Q (NU) | | AUDIT Q | AUDIT Q | 48 CHARACTER |
| AUDIT QM (NU) | | AUDIT.QM | AUDIT.QM | 48 CHARACTER |
| AUDIT Q OPEN OPTION (NU) | | LOCAL Q=1 | LOCAL Q=1 | 1 DECIMAL |
| AUDIT PERSISTENCE (NU) | | NON-PERSISTENT=0 | NON-PERSISTENT=0 | 1 DECIMAL |
| AUDIT PRIORITY (NU) | | 5 | 5 | 1 DECIMAL |
| MESSAGE PERSISTENCE | | PERSISTENT=1 | PERSISTENT=1 | 1 DECIMAL |
| MESSAGE PRIORITY | | 5 | 7 | 1 DECIMAL |
| LUW OVERRIDE PERMISSION | | N | N | 1 CHARACTER |
| NATIVE MQ MESSAGE FLAG | | N | Y | 1 CHARACTER |
| MESSAGE FORMAT | | FLAT DATA=0 | BINARY DATA=1 | 1 DECIMAL |

FIG. 5

APPLICATION INDEPENDENT MESSAGING SYSTEM

CROSS REFERENCE TO RELATED APPLICATIONS

This application is based on and claims priority to U.S. Provisional Patent Application No. 60/108,285, filed on Nov. 13, 1998, entitled GLOBAL QUEUED INTERFACE TRANSPORT.

FIELD OF THE INVENTION

The present invention generally relates to inter-system and intra-system messaging systems and more particularly to a messaging system architecture which provides an abstraction layer between application programs and the messaging transport layer.

BACKGROUND OF THE INVENTION

Starting decades ago with the mainframe computer, the first wave of the computing revolution empowered enterprises to manage huge volumes of information, fueling a massive growth in the scale of commerce worldwide. The introduction of the personal computer began the second wave of the continuing revolution, bringing the power of information creation to individuals. One factor in the growth of computing has been the development of interfaces that enabled various computer program applications to pass data to each other and otherwise communicate with each other. This inter-application or inter-computer communication is generically described as "messaging."

Presently, networks are emerging as the third wave of the computing revolution, enabling both enterprises and the individuals to rapidly and easily communicate information throughout the world. However, a significant problem which has impeded inter-network and intra-network communication is the diversity of the interfaces, both hardware and software which have been developed throughout the years.

Recognizing this problem, representatives of major computer and telecommunication companies, beginning in 1983, developed and adopted a standard model for communication. The standard, known as OSI (Open Systems Interconnection) is used to guide product developers and manufacturers so that their products will consistently work with other products. OSI was officially adopted as an international standard by the International Organization of Standards (ISO).

The OSI model defines seven layers of functionality that takes place at each end of a communication. Although OSI is not always strictly adhered to in terms of keeping related functions together in a well-defined layer, many if not most products involved in telecommunications and messaging make an attempt to describe themselves in relation to the OSI model.

The key idea in OSI is that the process of communication between two end users in a telecommunication network can be divided into layers, with each layer adding its own set of special, related functions. The systems on each end of a communication in some manner incorporates these seven layers of function. In a given message between users there is a flow of data through each layer at one end down through the layers in the computer used by the sending user and, at the other end, when the message arrives, another flow of data up through the layers in the receiving user's computer. The actual programming and hardware that furnish these seven layers of function is usually a combination of the computer operating system, applications (such as a Web browser), Transmission Control Protocol/Internet Protocol (TCP/IP) or alternative transport and network protocols, and the software and hardware that enables the computer to physically place a signal on a hardware line attached to the computer.

The seven OSI layers are graphically illustrated in FIG. 1. The seven layers are logically divided into two groups. The lower three layers, 140–160, are used when any message passes through the host computer. The upper four layers, 110–130, are used whenever a message passes to or from an application executing on the host computer. Messages between two host computers pass through all seven layers 100–160. Messages destined for some other host (e.g., when the instant host is acting as an intermediate node in a network) are not passed up to the upper layers 100–130 but are forwarded to the host (or another intermediate node).

The seven OSI layers include an Application Layer 100; a Presentation Layer 110; a Session Layer 120; a Transport Layer 130; a Network Layer 140; a Data Link Layer 150; and a Physical Layer 160. The Application Layer 100 is the layer at which communication partners are identified, quality of service is identified, user authentication and privacy are considered, and any constraints on data syntax are identified. Note that the Application Layer 100 is not the application itself, but rather provides an interface to the user. Some applications may perform application layer functions. Some implementations of the Application Layer 100 include, but are not limited to E-mail, newsgroups, web applications, file transfers, host sessions, directory services, network management, and file services.

The Presentation Layer 110 is usually part of an operating system which converts incoming and outgoing data from one presentation format to another. For example, the Presentation Layer 110 might convert data from a text stream into a popup window. The Presentation Layer 110 is sometimes called the syntax layer. Some implementations of the Presentation Layer 100 include but are not limited to POP/SMTP, Usenet, HTTP, FTP, TelNet, DNS, SNMP, and NFS.

The Session Layer 120 sets up, coordinates, and terminates conversations, exchanges, and dialogs between the applications at each end of the communication. The Session Layer 120 sets up and manages session and connection coordination. Some implementations of the Session Layer 120 include but are not limited to POP/25, 532, 80, 20/21, 23, 53, 161/162 and RPC Portmapper.

The Transport Layer 130 manages the end-to-end control of the communication, for example, determining whether all packets have arrived and error-checking. The Transport Layer 130 ensures complete data transfer. Standards such as TCP and UDP are implementions of the Transport layer 130.

The Network Layer 140 handles the routing of the data. This routing involves sending a message in the right direction to the right destination on outgoing transmissions and receiving incoming transmissions at the packet level. The Network Layer 140 performs routing and forwarding of messages. Internet Protocol Versions 6 and 4 are implementations of the Network Layer 140. The Data Link Layer 150 provides error control and synchronization for the Physical Level 160.

The Data Link Layer 150 also furnishes transmission protocol knowledge and management. Standards such as SLIP, PPP, 802.2 SNAP, Ethernet II are implementations of the Data Link Layer 150.

The Physical Layer 160 is the layer that conveys a bit stream through the network at the electrical and mechanical level. Layer 160 provides the hardware means of sending and receiving data on a carrier. Standards for the Physical Layer include RS-X, Cat 1, ISDN, ADSL, ATM, FDDI, Cat 1–5, as well as Coaxial Cables.

Even though the adoption of the OSI model has lead to a certain level of uniformity in messaging, the diversity of the actual implementations of the model still remains a vexing problem for application programmers and system integrators. One result of this complexity is that applications have been forced to include "hardcoded" descriptions of the various other applications, platforms, formats and routing used for messaging. If any of these parameters change (e.g. a new version of an operating system) the application program must be modified, recompiled and tested. This is a huge problem in conventional messaging architectures.

Accordingly, there is a long felt need in the industry for a messaging architecture which allows diverse applications on diverse platforms to communicate with each other. Such an architecture should enable application developers to concentrate on the substance of their applications and disregard the complex physical infrastructure associated with messaging.

SUMMARY OF THE INVENTION

The present invention provides a messaging system which includes Application Programming Interfaces (API) which isolate application programs from the underlying transport and routing mechanisms that are actually used to convey messages. These APIs are also known as abstraction layers since the application can conceptually view the transport and routing mechanism abstractly and not be concerned with the details of the specific formatting and routing required for transport and routing.

One method by which the APIs of the present invention provide this isolation is through the use of directory files. The directory files contain all of the specific details (e.g. formatting and routing parameters) necessary to interface with the transport and routing mechanisms. As the transport and routing details change (e.g. due to updated versions or new mechanisms) only the directory files need to be changed without the need for recoding, recompiling or extensive testing of the application programs. This solves a significant problem of the prior art in which the details of interfacing with the transport and routing mechanisms were "hardcoded" into the application program itself.

Another aspect of the present invention is that it enhances the ability for an application to take advantage of a transport mechanism's asynchronous messaging capability. This is a significant departure from and advantage over certain prior art which required applications to coordinate and manage the transmission and routing of a message all the way to its destination. In the present invention, once an application has issued a message to the API, control returns to the application which can then continue its substantive processing without having to concern itself with the transport and routing of the message. A huge advantage of asynchronous messaging is found in the area of testing. In the synchronous messaging prior art, when a new or updated application was brought online, testing of the application required that systems with which the application interfaced had to be taken out of service in order to test the new application. As the present invention enhances the capability of asynchronous messaging, the new application can be tested by itself and testing of the messages it produces can be accomplished by the other systems at a time which is convenient for the other system. This advantage results in significantly faster cheaper and easier application development and testing.

The present invention further includes Message Processing Servers (MPSs) which provide additional messaging functionality such as message storage, tracing, reconciliation, statistical auditing, reformatting, content based routing and multicasting. As additional functionality is developed, this functionality can be flexibly incorporated into a new MPS.

BRIEF DESCRIPTION OF THE DRAWINGS

For the purposes of illustrating the present invention, there is shown in the drawings a form which is presently preferred, it being understood however, that the invention is not limited to the precise form shown by the drawing in which:

FIG. 5 illustrates an example of a Directory and its contents;

DETAILED DESCRIPTION OF THE INVENTION

Figure 2:
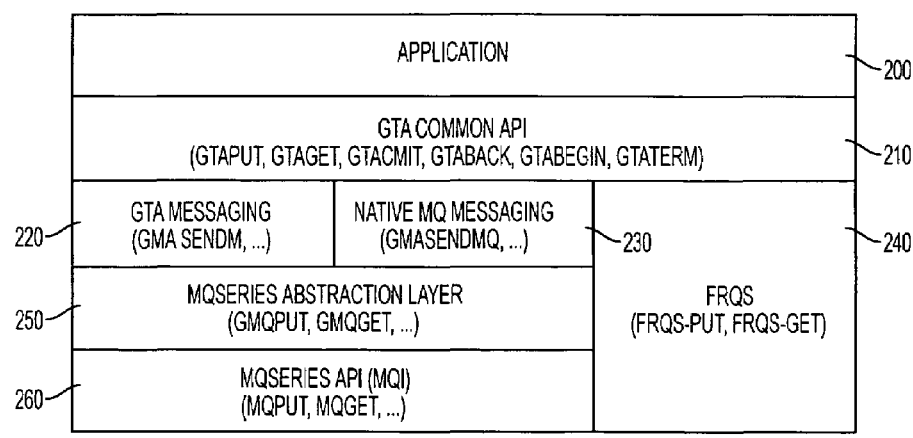
FIG. 2 depicts the messaging architecture layers of the present invention.

FIG. 2 graphically illustrates the different layers of the messaging architecture of the present invention. As described above, one of the primary goals of the present invention is to isolate Applications 200 from the details of the logical and physical messaging middleware used to actually transport messages. In order to isolate Applications 200 from the underlying transport layers, the messaging architecture provides an isolation or abstraction layer 210 above the transport and routing layers. For the purposes of this disclosure, the layers below the abstraction layers 210 (and 220, 230 to be discussed below) are considered part of the transport infrastructure. The transport infrastructure also includes all of the physical components necessary to convey messages between two points (e.g. telephone lines and switching equipment).

As shown in FIG. 2, the Global Technology Architecture (GTA) common Application Programming Interface (API) layer 210 is the only one exposed to the Application 200. As used in the instant specification, the present invention is sometimes referred to as a Global Technology Architecture (GTA). The term global is used to denote the fact that in a preferred embodiment of the present invention the architecture is preferably adopted by and used in each of the computing operations of an enterprise throughout the world. The GTA common API includes the modules GTAPUT, GTAGET, GTACMIT, GTABACK, GTATERM, and GTA-BEGIN that will be discussed in more detail below. The two most common modules are used by Applications 200 to send messages (GTAPUT) and to receive messages (GTAGET).

Beneath the abstraction layer 210 lie the interfaces to the actual transport mechanisms. Illustrated in FIG. 2 are two different types of messaging middleware used as the transport mechanism, MQSeries 260 and Function Router Queue Subsystem (FRQS) 240. FRQS 240 is a proprietary messaging middleware product developed in house by the assignee of the present invention. MQSeries 260 is a messaging middleware product offer by the IBM Corporation and is presently the de facto standard in the industry for messaging middleware. The use of MQSeries 260 is a preferred embodiment of the present invention as the MQSeries 260 is currently available for thirty five different platforms including but not limited to Win NT, Win 95, Win 98, IBM's AIX platform, Sun Solaris, HP UX Platforms.

Although the present invention can easily be adapted to work with any messaging middleware, such as DECMessageQ, the present description shall be made with respect to the MQSeries 260 and FRQS 240 products as the operation of the present invention has been reduced to practice with respect to both of these middleware products.

As shown in FIG. 2, the interface between the GTA common API 210 and the FRQS 240 system is direct without any further abstraction layer required. In contrast, if a message is intended for transport using the MQSeries 260, there are two additional abstraction layers 220 or 230, and 250. The present inventors have developed the GTA Messaging (GMA) layer 220 in order to provide additional functionality that is not found in the MQSeries 260. In this respect, a GTA Messaging message is a customized form of a native MQSeries message. As will be further described below, the functionality provided by GTA Messaging includes logic for block processing, asynchronous responses and archiving. The architecture of the GTA Messaging of the present invention is primarily accomplished through the use of additional headers attached to the message. These headers are read by the GTA Messaging APIs in order to extract the instructions for the desired processing to be performed by the API (e.g. block processing).

If the partner application (i.e. the message receiving application) does not have access to the GTA Messaging functionality and accordingly cannot properly receive and interpret GTA Messages, the GTA common API has the capability of sending messages using the Native MQ Messaging Layer 230. All systems which employ the MQSeries 260 for the transport mechanism are capable of receiving messages generated by the Native MQ Messaging Layer 230.

Below the GMA layer 220 and the Native MQ Messaging layer 230, there is an additional abstraction layer denoted as the MQSeries Abstraction Layer 250. This abstraction layer 250 provides a simplified wrapper around the MQSeries 260 in order to further aid in simplifying the architecture of the present invention. The MQSeries abstraction layer 230 (also known as GMQ) simplifies the MQSeries commands by defaulting certain options and simplifying the calling structure.

Figure 1:
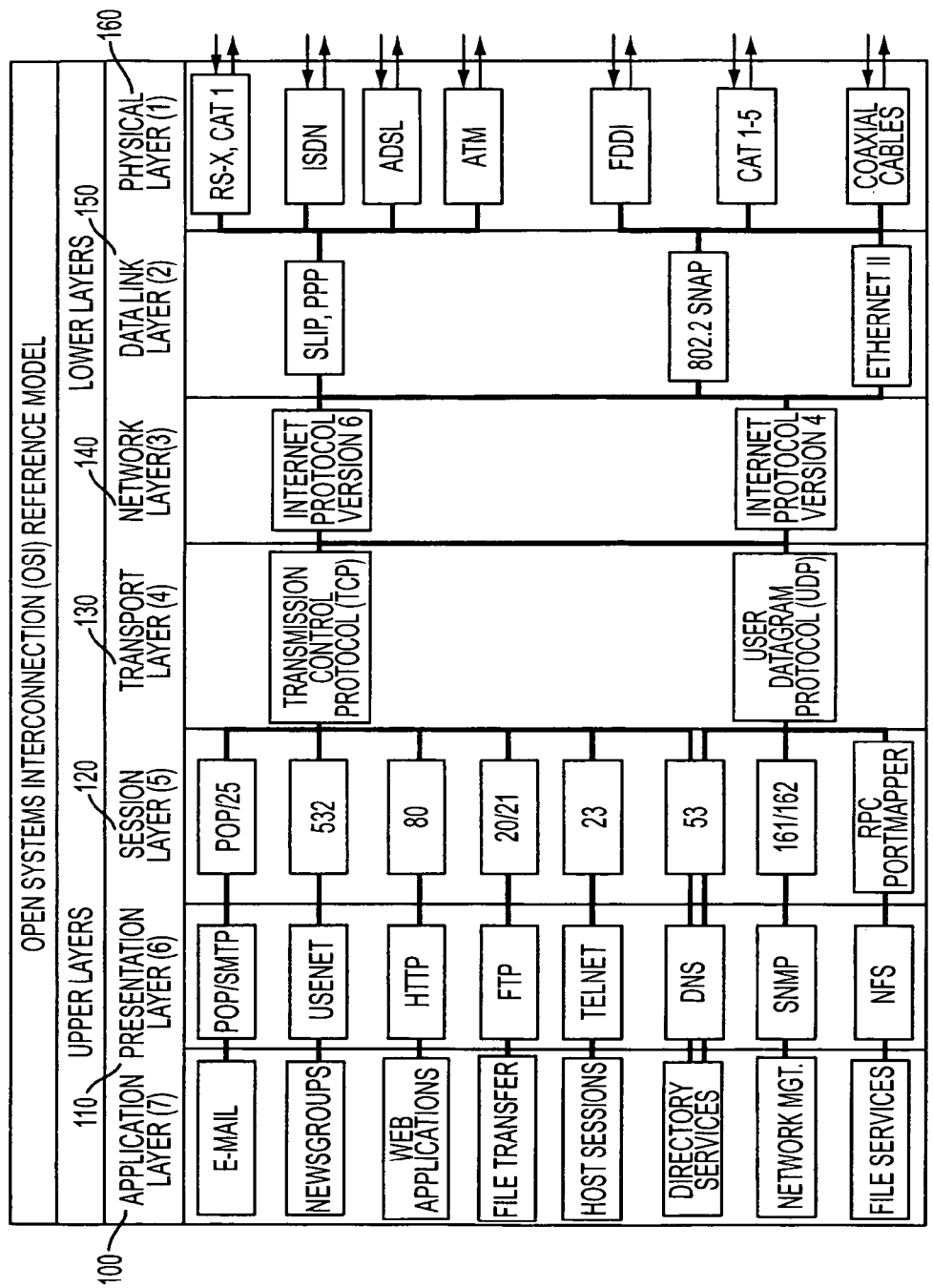
FIG. 1 illustrates the seven layers of the Open Systems Interconnection architecture of the prior art.

In relation to the OSI Model described with respect to FIG. 1, the abstraction layers 210, 220, 230 and 250 of the present invention depicted in FIG. 2 correspond to Application layer 100, the Presentation Layer 110 and the Session Layer 120. The MQSeries 260 and FRQS 240 of FIG. 2 correspond to the Transport layer 130 of FIG. 1.

Abstraction is a key concept of the present invention that frees Applications 200 from being directly tied to a specific vendor product (e.g. MQSeries 260). As further described below, the present invention achieves a certain level of abstraction through the use of directories which contain the vast majority of the transport mechanism specific details. Abstraction is a process of deriving a simplified description, or specification, of a system (in the present case MQSeries 260 and FRQS 240) that emphasizes some of the system's details or properties while suppressing others. A good abstraction is one that emphasizes details that are significant to the user and suppresses details that are immaterial to the functionality required by the user.

As an example of the abstraction provided by layers 210–230, these abstraction layers 210–230 simplify messaging such that an Application 200 only needs to supply a small percentage of the fields that MQSeries 260 requires to send a message (apart from the message itself). The remainder of the required fields are populated by the abstraction layers 210–230 using default data from public directories. Furthermore, the abstraction layers 210–230 only allow an application 200 to override a limited number of the default fields provided by the directories.

The present invention maintains most of the functionality at the abstraction layers 210–230 so that an Application 200 does not have to sense and discriminate, for example, differences in data formats. If an Application 200 were to communicate directly to MQSeries 260 there are numerous options which the Application 200 would have to select with respect to sending a message. Therefore, the abstraction layers 210–230 reduce the number of selectable options, thereby simplifying the task of messaging. This architecture is accordingly cheaper to maintain, requires shorter training and prevents the inherent danger of allowing the Application 200 to have full access to the Transport layer 240 or 260.

As a specific example of the abstraction provided by layers 210–230, MQSeries 260 has one to ten priority codes. If multiple applications 200 were communicating directly with MQSeries 260 and each application 200 set the same priority on all of the messages being sent (e.g. the highest priority), the priority function would become meaningless and none of the messages would be sent with a higher priority. In the abstraction layers 210–230 of the present invention, every request starts off as being treated of equal priority. Instead of allowing the Application 200 to assign the MQSeries specific priority of one to ten, the Application 200 can only specify an increase or decrease from the presently assigned priority.

In general, the simplification produced by abstraction results in the taking away of certain functionalities. Since most messaging middleware (e.g. MQSeries 260) is developed to satisfy the broadest range of users, in a system according to the present invention, the abstraction layers 210–230 are developed to provide only the necessary functionality required by the Applications 200 serviced by the system. In some cases, the removal of functionality is actually a requirement of the system. For example, in a preferred embodiment of the present invention, the system operates in a banking environment. In this environment, it is desirable to prevent access or changes to dynamic messaging queues in order to prevent a user from rerouting a message representing a money transfer, thereby effectively misappropriating the money.

Figure 3:
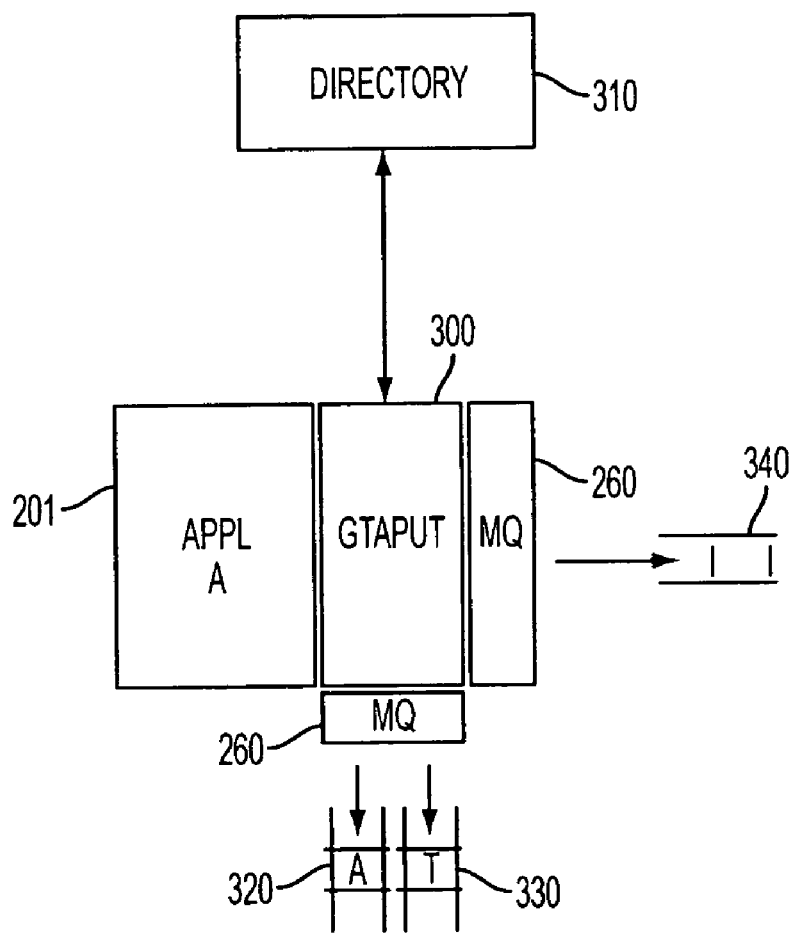
FIG. 3 illustrates the operation of the message sending module GTAPUT.

FIG. 3 illustrates the operation of one of the key modules of the GTA common API 200 (see FIG. 2) the message sending module GTAPUT 300. The module GTAPUT 300 is called by an Application 201 when it needs to send a message. An Application 201 instantiates GTAPUT 300 with the message which is to be sent and control blocks that indicates the specific processing requirements for the message (e.g. block processing).

In one embodiment of the present invention, applications running under the Customer Information Control System (CICS) pass the message and the control block to the GTAPUT module 300 using a common area or a temporary storage queue. On distributed platforms, GTAPUT 300 is dynamically linked to the application 201 at runtime. Linking is the process of converting a runtime library into an executable program. The messaging architecture of the present invention supports an application's logical unit of work with and without a Transaction Processing (TP) monitor. For platforms with a TP monitor, such as CICS, the architecture participates in a TP monitor's commit or rollback. In the absence of the TP monitor, the present invention allows applications to explicitly issue GTACMIT and GTABACK (see 210 in FIG. 2) commands to commit or rollback pending GTAPUT or GTAGET operations.

Applications 201 need to manage Logical Units of Work (LUW) in order to maintain data integrity across multiple resources. When putting or getting messages, applications 201 must specify whether the messages are part of an LUW by using the appropriate calling options. The GTAPUT and GTAGET APIs performing message operations use the underlying service layers (250, 260) in FIG. 2) to perform pending puts or gets. When the application 201 issues a GTACMIT, the module will use the underlying service layers to commit pending message operations. Conversely, the GTABACK command is a backout command which will rollback pending message operations in the present invention. A call to GTABEGIN is used to start a unit of work that is coordinated by the queue manager and that involves changes to resources owned by other resource managers.

The control blocks sent to GTAPUT 300 by the Application 201 contain the parameters which enable GTAPUT 300 to prepare the message for passage to the transport layer, in this case MQSeries 260. As described above, the parameters available to Application 201 for passage to the Abstraction layer 210 (see FIG. 2) are intentionally limited, since it is desired that the architecture of the present invention be as simple as possible.

Using the limited parameters passed to it by the Application 201, GTAPUT 300 retrieves the full compliment of parameters required by MQSeries 260 from Directory 310. Most of these parameters are default parameters retrieved from Directory 310 based on the limited parameters specified by the Application 201. After MQSeries 260 has performed all of its processing, it transmits the message 340 in its final form on the physical transportation mechanism. The records 320 and 330 illustrated in FIG. 3 respectively represent an Archive record and a Trace record as will be discussed in greater detail below. Archiving and Tracing are options which are set in the Directory 310. In a preferred embodiment of the present invention, the option of turning Archiving and Tracing on and off for messages is not given to an Application 201. Rather, Archiving and Tracing are enabled/disabled according to settings found in the Directory 310.

As a matter of convention in the present disclosure, the Directories 310, the MQSeries 260 and the GTA Messaging APIs (e.g. GTAPUT 300) will be given the same character designation. It is readily appreciated that these modules, tables and interfaces can and do exist as different physical entities at different physical locations, but the function provided by each is the same regardless of where it is installed and used. For example, the basic functioning of the module GTAPUT 300 will be the same on a platform in New York as it is on a platform in London or Dallas. With respect to Directories 310, a Directory 310 at one location will naturally contain different entries which are required to support the applications residing on that platform while a Directory 310 on a different platform will have entries required to support the applications on it's platform.

Figure 4:
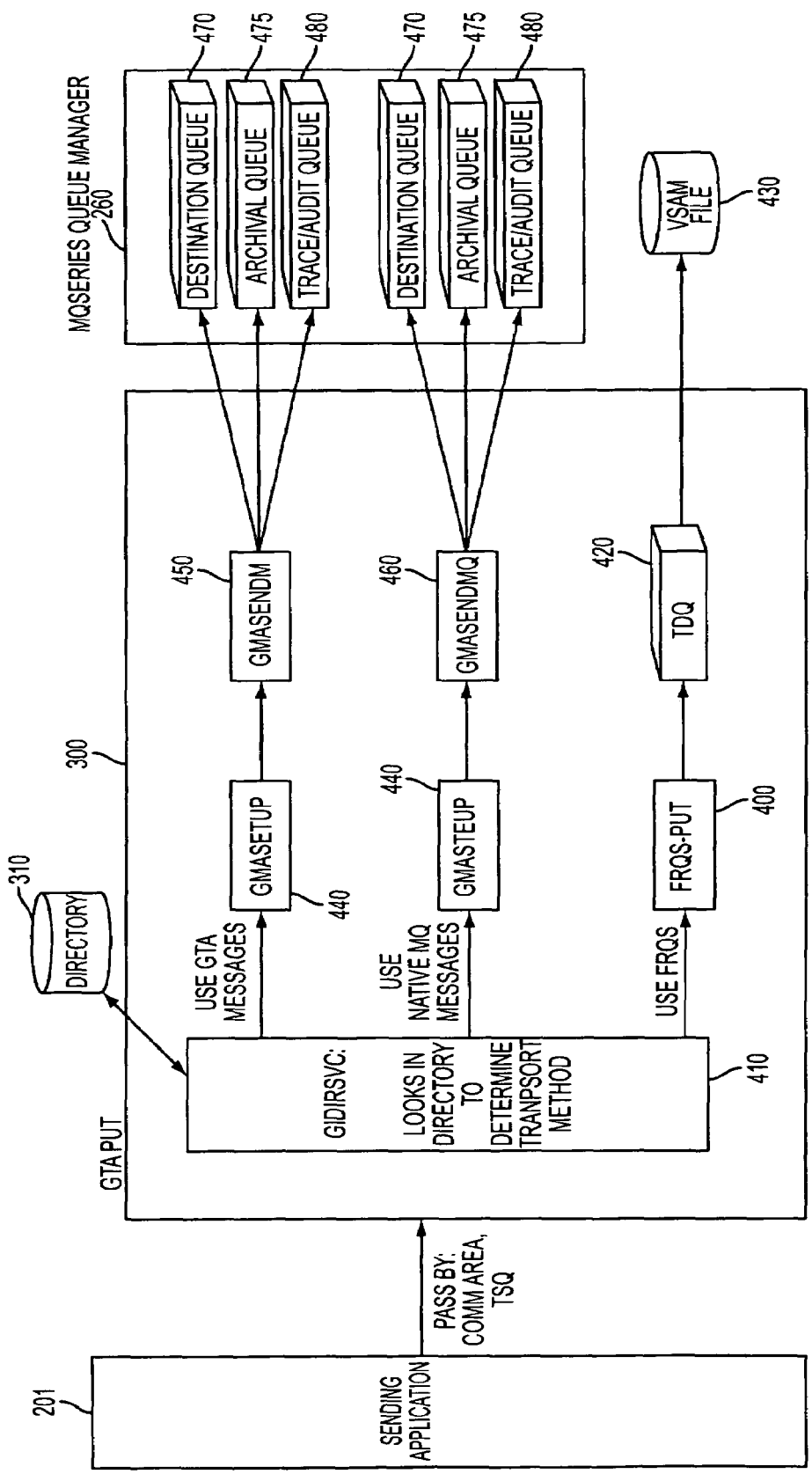
FIG. 4 depicts a detailed implementation of the message sending module GTAPUT of FIG. 3.

FIG. 4 illustrates in greater detail the interaction between the various components employed in sending a message according to the present invention. As previously described, an Application 201 starts the message sending operation by passing to GTAPUT 300 the message and some control blocks. The two most significant control blocks passed by the Application 201 to GTAPUT 300 are a request block and a return block. The request block contains all of the parameters required by GTAPUT 300 to process an outgoing message and the return block contains all the parameters required if the Application 201 desires any feedback with respect to the sending of the message.

The most important parameter contained in the request block is called the service identifier. The service identifier is used by GTAPUT 300 as a key to access the Directory 310 in order to fill in all of the details required to send a message. As will be further described below with respect to Directory 310, each service identifier will point to a different set of default parameters which GTAPUT 300 can use to interface with MQSeries 260 in order to send (or receive) a message. As a result of using the simple service identifiers and directory architecture, the present invention enables the Application 201 to be free of any of the details of the transport of a message. Although MQSeries 260 is a preferred transport layer (due to its wide commercial acceptance) as illustrated in FIG. 4, other transport mechanisms such as FRQS 400 can be used. It is readily appreciated that other transport mechanisms can be used without departing from the architecture of the present invention.

Applications 201 typically have predetermined destinations for their messages. For example, Application 201 running on a platform at location A has a regular need to send one type of message to a second application running on a different platform at location B and a different type of message to yet a different platform at location C. Using the architecture of the present invention, a first service identifier, e.g. Ser_Id_B, points to all of the details required to send a message to the application at location B and a second service identifier, e.g. Ser_Id_C is set up to point to the details needed to send a message to the application at location C.

When the Application 201 needs to send a message to the application at location B, it calls GTAPUT 300 with a request block that specifies service identifier Ser_Id_B. Using the service identifier Ser_Id_B, GTAPUT 300 performs what is essentially a lookup in Directory 310 in order to identify all of the parameters required by MQSeries 260 to send the message. In this example, supposing Application 201 did not specify any overrides, all of the parameters required to send the message are the default parameters found in the Directory 310 for the service identifier Ser_Id_B. With all of the default parameters in hand, the message is passed to the MQSeries 260 which then transmits the outgoing message over the physical transmission means.

Other than the service identifier, the request block from the Application 201 can contain a block indicator which identifies if the message being sent is part of a block, and a priority flag which indicates if a priority which is higher or lower than the default (found in the directory) should be used to send the message.

If an application 201 has a requirement that different types of messages require different types of configurations, such as priority and persistence, then separate service identifiers exist for the different configurations. By adhering to this simplified architecture, future changes to these configurations can be made by changes in the Directory 310 without changing the code of the Application 201.

Furthermore in the example described above, if there is change in the platform at either location B or C (e.g., the platform changes to an AIX platform) no change whatsoever is required to the Application 201. The changes required to accommodate the different platform are accomplished in Directory 310. Similarly, if the receiving application to which Application 201 send messages moves to a new location D, only the Directory 310 containing the messaging transport details is required to be changed. In either of the change scenarios just described, Application A will still send a message using the exact same service identifier (e.g. Ser_Id_B or Ser_Id_C) and no changes to the Application 201 are required.

GTAPUT 300 is used by Applications 201 to send messages asynchronously. This is a significant advantage over the prior art messaging systems which required that messaging occurred synchronously, that is, occurring at predetermined or regular intervals. One further significant advantage of the asynchronous messaging architecture of the present invention is that if such changes occur as described above, all of the testing required to test the changes can be done without impacting other applications. For example, if there is a change in Application 201, it can send its messages asynchronously, which can be received and processed by the receiving application when it is ready. In the prior art synchronous messaging systems, both the sending and receiving applications had to be taken offline for such testing which resulted in significant costs associated with the testing. The asynchronous nature of the present invention avoids all of these costs associated with testing.

As shown in FIG. 4, GTAPUT 300 calls a directory services interface module (GIDIRSVC) 410 to retrieve the configuration information related to the sending Application 201. This call is made using the service identifier specified by the Application 201 in the request block. Since the Application 201 may use GTAPUT 300 many times to access different services, the Application 201 may need multiple service identifiers as described above.

In addition to the service identifier, the sending Application 201 specifies the sender application name and the sender subsystem to form a three part key to the Directory 310. The application name uniquely identifies the component of the application using messaging. For example, the post trade component of a security movement and accounting system. The subsystem identifies the application system to which the component issuing the messaging function belongs. For example, the security movement and accounting system. As described above, the service identifier uniquely identifies the messaging service which an application component is requesting.

As will be further described below, when an application 201 is receiving a message, it must similarly supply the receiver application name, receiver subsystem, and receiver service identifier in order to properly access the directory 310.

FIG. 5 illustrates an example of a Directory 310 and its entries for two different service identifiers Send_Trade 318 and Default_Put 319. Each directory entry corresponds to a unique combination of a service identifier 312, subsystem identifier 314 and application identifier 316. The following is a brief explanation of the fields which can be contained in the a Directory 310. All of the entries described below are not illustrated in FIG. 5.

The Archive Q Open Option field indicates the mode in which the GTA messaging architecture should open the archive queue.

The Archive Queue field specifies the queue to which an exact copy of the message will be sent for archival purposes. The message will have the same GTA header and MQ Message ID as the original message. If archived on the sending side, the term is Resend, if archived on the receiving side, the term is Replay.

The Archive Queue Manager field specifies the queue manager on which the archive queue is located. This field contains the default queue manager for the platform, but can be specified as any remote queue manager.

The Destination Queue Open Option field indicates the mode in which the GTA messaging architecture should open the destination queue.

The Destination Queue field specifies the queue to which the message will be sent. This field is used in GTAPUT operations only, and returned to the sending application through the return block.

The Destination Queue Manager field details the queue manager to which the message is being sent. The manager specified in this field must be set in conjunction with the destination queue.

In one embodiment of the present invention, the Error Queue Messages field specifies the queue to which error messages are sent. Messages retrieved from a queue may exceed the memory allocated by the application for holding them. If this is the case, the GTA messaging architecture indicates that a severe error has occurred and forwards the message to the error queue specified in this field. Likely settings include sending the message back to the queue it was received from, the dead letter queue, or an application specific error queue.

The Error Queue Manager field contains the queue manager on which the error queue exists.

The Input Open Option field indicates the mode in which the GTA messaging architecture API should open the input queue. The Input Queue field describes the queue which the GTAGET operation uses to retrieve incoming messages (see below for GTAGET). As MQSeries only supports getting a message from the local queue manager, no input queue manager needs to be defined.

The LUW Override Flag field indicates whether applications 201 are allowed to override the logical unit of work (LUW) controls and put messages outside of the current LUW. Applications 201 can specify in the request block whether or not the messaging operation should be included in the current logical unit of work.

The Message Format field is used to specify whether the message being put of type MQSTR or GTA_VA. These types correspond to flat (text) data and binary data, respectively. Valid settings for this field in the GTA directory service are: 0 MQSTR format; and 1 GTA_VA format. This field is used within the architecture to populate the format field of the message header. The receiving application uses this field to determine whether the message should be converted upon retrieval.

The Message Persistence field indicates what persistence should be used when sending a message. Persistence regards what happens to messages on a queue when the queue manager is brought down. Persistent messages are logged and are guaranteed by MQSeries to not be lost in the case of the queue manager being brought down. Non persistent messages are not logged, and are guaranteed by MQSeries to be removed from the queues when the queue manager is brought down. As a result of logging, use of persistent messages incurs a performance impact.

The Message Priority field contains the default priority assigned to the message. Priority settings allow for certain messages to take precedence over others on prioritized queues. In a preferred embodiment, all of the queues in the messaging architecture support priority messaging. The range of priorities supported by GTA messaging in a preferred embodiment is from 0–9. The range 5–7 is reserved for application messages, with 5 being lower than normal, 6 the default priority, and 7 for high priority or urgent messages.

The field Native MQ Messaging Flag is used to determine whether a GTA message or native MQ message is being sent or retrieved. If native MQ messaging is turned off, a GTA message (with all GTA specific headers) will be sent/expected. Otherwise, a message without any GTA specific information will be sent/expected. Valid settings for this field are: Y Native MQ messaging is turned on; and N Native MQ messaging is turned off (where GTA messaging will be used).

The Replay Archive Flag field indicates whether a copy of the message should be archived when it is retrieved. This is the standard archiving mechanism for GTAGET.

The Reply to Application, Reply to Service and Reply to Subsystem fields dictate which directory entry the receiver must use when putting a reply. If the architecture uses distributed instead of centralized directory services, it is necessary to pass the reply to information along with a message to ensure that the application receiving the application uses the correct directory entry when putting a reply message. The reply to application, reply to service, and reply to subsystem keys should be populated only when a response is necessary. If no response is required, these fields are left blank. If these field are populated, the receiving application assumes that a reply is required.

The Resend Archive Flag indicates whether the message should be archived on the sending side. This is the standard archiving used within GTAPUT 300. The archived message includes all of the same information found in the original message, including the same message identifier. It will be put to the Archive Queue Manager, Archive Queue.

The field Trace Flag indicates whether or not tracing is turned on for a given service identifier 312. Tracing messages can be sent to a centralized location to enable reconciliation processes to detect if messages are not being processed.

The Trace Open Option field is used when sending tracing messages.

The Trace Persistence field indicates what persistence should be used when sending a tracing message. Persistence regards what happens to messages on a queue when the queue manager is brought down. Persistent messages are logged and are guaranteed by MQSeries 260 to not be lost in the case of the queue manager being brought down. Non persistent messages are not logged, and are guaranteed by MQSeries 260 to be removed from the queues when the queue manager is brought down. As a result of logging, use of persistent messages incurs a performance impact. Valid settings for Trace Persistence are 0—Not Persistent (Default), and 1—Persistent.

The Trace Priority field allows for certain messages to take precedence over others on prioritized queues. In a preferred embodiment, all of the queues in the present messaging architecture support priority messaging. As previously stated, in the preferred embodiment of the present invention, the range of priorities supported by GTA messaging is from 0–9. The range 5–7 is reserved for application messages, with 5 being lower than normal, 6 the default priority, and 7 for high priority or urgent messages. The default setting for trace messages is therefore 4, i.e. lower than all application messages.

The Trace Queue field describes the queue to which trace records should be sent for this application.

The Trace Queue Manager field contains the queue manager on which the trace queue resides.

The Transport Method field describes the transport mechanism (e.g. MQSeries 260) should be used for the message.

The Wait Flag indicates, when retrieving messages, if application will wait for messages to arrive or whether it will exit immediately if the required message is not on the queue. The valid values for this entry are: Y—Wait for a message to arrive on the queue; N—Do not wait for a message to arrive on the queue.

The Wait Interval field sets the time-out interval when waiting for a message.

Returning to FIG. 4, based on the information retrieved from the Directory 310, by the directory services module GIDIRSUC 410, GTAPUT 300 is ready to format the message for the chosen transport method. As previously described, in a preferred embodiment of the present invention, three different transport methods are supported, GTA messaging using MQSeries (440, 450), native MQ messaging using MQSeries (460, 470) and FRQS messaging (400, 420, 430).

As previously described, FRQS is a proprietary transport method developed in-house by the assignee of the present invention. FRQS does not form any part of the present invention, but a description of FRQS has been included herein to illustrate the operation of the present invention with transport mechanisms other than the MQSeries 260. If FRQS messaging is the chosen transport method, a module FRQS_PUT 400 is called to put a message to the Transient Data Queue 420 which puts the message in a Virtual Storage Access Method (VSAM) file 430. The receiving application then retrieves the message from the VSAM file 430.

If FRQS messaging is not selected, the message will either be sent using GTA messaging (440, 450) or native MQ messaging (440, 460). As previously described, the difference between GTA messaging and native MQ messaging is that GTA messaging provides extra functionality not provided by the MQSeries 260 (e.g. block messaging). A GTA message, or infrastructure message, is defined as application data with GTA specific headers and trailers. A native MQ message contains application data only, without any of the GTA specific headers or trailers. To support both types of messages, the present invention uses configuration maintained within Directory 310 to determine if native MQ messaging or GTA messaging should be used to send or retrieve a message. Therefore, applications 201 requiring the use of native MQ messaging must request a service (through a service identifier) which is configured appropriately to indicate the sending or retrieving of a native MQ message. Failure to use an appropriate service will result in the sending of a GTA message or an attempt to retrieve a GTA message, ultimately causing an error.

GMASETUP 440 performs the processing necessary to establish queue manager and local/remote queue object connections. GMASETUP 440 is used both for GTA messaging and for native MQ messaging. Supplied with the appropriate queue manager name and/or queue object names from the Directory 310, this module 440 returns the queue manager handle and/or the queue object handles as required by the calling application 201. The information is saved in a structure that can be referenced by subsequent modules. In an object oriented environment (e.g. C++) GMASETUP 440 connects the application 201 to the queue manager and all associated local and remote queue objects (request, response, trace/audit, and archive). Within CICS, GMASETUP 440 does not have to connect to the queue manager since the connection is kept open by CICS. However, GMASETUP 400 still has to open the queues that the application 201 will use (as specified as defaults in Directory 310). Outside of CICS, GMASETUP 440 has to connect to the appropriate queue manager and open the appropriate queues that the application 201 will use.

For GTA messaging, the GMASENDM module 450 asynchronously sends at least one message to the request queue of a Message Processing Server (to be described below). This module 450 sets the appropriate MQ and GTA architecture options as specified from the retrieved Directory 310 information, fills in the GTA architecture header and MQMD (MQ message descriptor) for appropriate message processing, and participates in logical units of work.

A message can be sent with a specific priority, based on a value in the Directory 310, which will override the default priority for messages on a queue. For block processing (to be described below), GMASENDM 450 can accept a correlation ID or leverage the MQ layer to generate one. This correlation ID is kept in the CorrelID field in the MQ message header. A sequence number is used to populate the GTA architecture header block. This aids in the detection of messages missing from a block on the receiving side.

For native MQ messaging, module GMASENDMQ 460 is responsible for sending a native MQ messages. The module 460 sets the appropriate MQMD (header) fields, sends archive and trace messages if applicable, and sends the application data using MQSeries 260. As with GMASENDM 450, GMASENDMQ 470 sends messages asynchronously. It sets the appropriate options to include or exclude the message in an logical unit of work (LUW). The appropriate priority and persistence values are set based on the value passed by the calling application (typically from the default values obtained from the Directory 310). GMASENDMQ 460 appends the architecture header prior to sending the message. GMASENDMQ 470 also creates archive and trace record provided the appropriate options are set.

Schematically illustrated in FIG. 4 are the Destination Queue 470, the Archival Queue 475, and the Trace/Audit Queue 480. Each of these queues are managed by the MQSeries 260. The Destination Queue 470 represents the queue at the message receiving location. The Archival Queue 475 is a queue used for archiving messages and the Trace Queue is used for tracing the transmission of messages, both of which will be described in more detail below.

Figure 6:
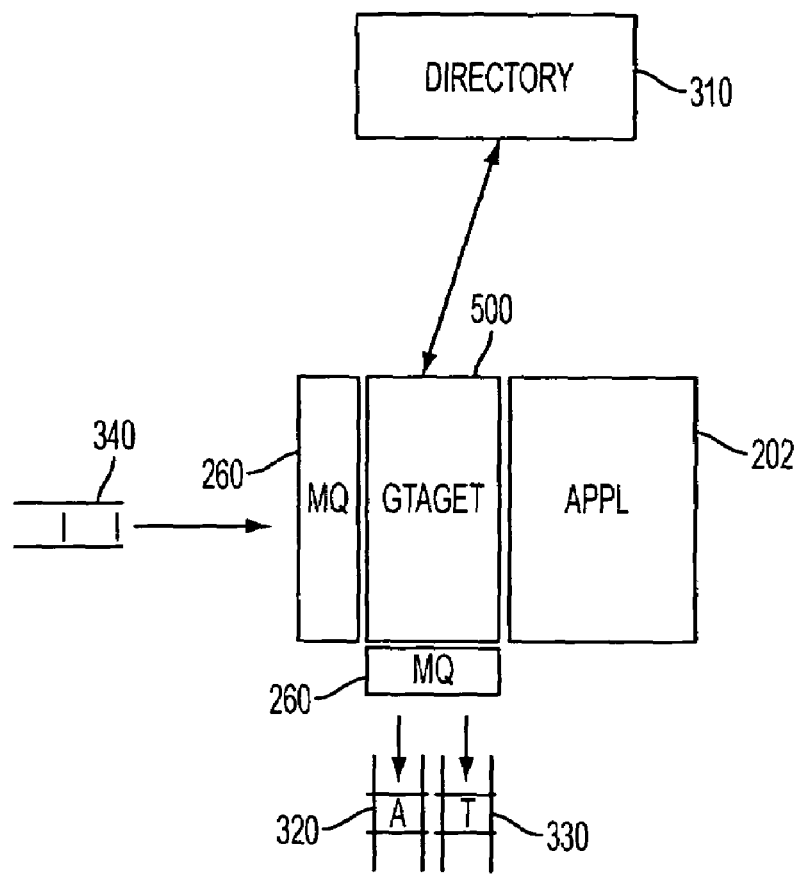
FIG. 6 illustrates the operation of the message receiving module GTAGET.

FIG. 6 illustrates the operation of one of the other significant module of the Abstraction layer 210 (FIG. 2) GTAGET 500. GTAGET 500 is the module which performs the function of receiving messages from the transport layer (e.g. MQSeries 260). When the message 340 is received on its destination queue, either via MQSeries 260 or FRQS 400 (FIG. 4), the receiving application 202 is triggered. This action is configurable, so certain Applications 202 can choose to poll rather than be triggered upon some identified action. Polling is a known management technique for issuing commands to the transport layer to get status information. The polling can be performed with a time-out internal.

Once a receiving Application 202 becomes aware of an arriving message 340, the receiving Application 202 then uses GTAGET 500 to receive the message 500. As with sending of messages using GTAPUT 300, the receiving Application 202 calls GTAGET 500 and passes a message buffer and parameters including the requested service identifier. GTAGET 500 uses the passed parameters to perform a look up in Directory 310 for the configuration settings based on the application name, the subsystem identification and the service identification. GTAGET 500 retrieves from the Directory 310 which queue to check. GTAGET 500 then retrieves the message 340 from the appropriate queue and returns it to the Application 202, and according to the settings in the Directory 310 generates trace 330 and archive 320 messages. The Directory 310 contains the destination queues for the trace 330 and archive 320 records.

As with GTAPUT 300, GTAGET 500 is used to retrieve messages sent asynchronously. GTAGET 500 can be configured within its Directory 310 to wait for a message to arrive. As previously described, the Directory 310 utilizes flag and valid time-out intervals for GTAGET 500.

Figure 7:
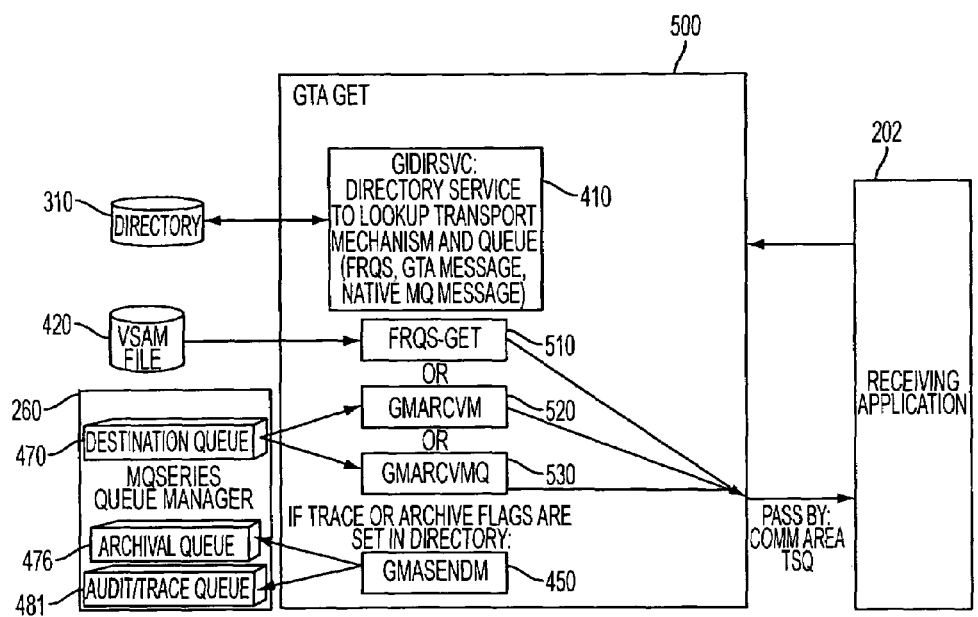
FIG. 7 depicts a detailed implementation of the message receiving module GTAGET of FIG. 5.

FIG. 7 illustrates in greater detail the operation of receiving a message according to the present invention. As previously described with respect to FIG. 4, two different transport layers MQseries and FRQS have been illustrated in FIG. 7. If a message is transmitted via the VSAM file 420 in accordance with the FRQS system, the directory services module GIDIRSVC 410 calls FRQS_GET to retrieve the message and passes it onto the receiving Application 202.

As also described with respect to FIG. 4, messages can be passed either through GTA messaging or native MQ messaging. If GTA messaging has been used (indicated by a flag in the Directory 310) the directory services module GIDIRSVC 410 calls module GMARCVM 520. GMARCVM 520 retrieves the next message from the queue specified in the Directory 310 for the identified service identifier. If the Directory 310 indicates that archival or trace records are required, GMASENDM 450 is called to send these archive and trace messages to their respective queues 476, 481.

GMARCVM 520 examines the header of the message to determine whether or not the message is part of a block of messages and if so, whether it is the first, intermediate or last message of the block. This information is passed back to the Application 202 along with the message data. If it is a broken block, GMARCVM 520 returns the appropriate error to the calling program. When retrieving messages from the queue, the module GMARCVM 520 allocates a dynamic storage area based on passed-in size of the expected message.

If the Directory 310 indicates the message to be received has been sent using native MQ messaging, the directory services module GIDIRSVC 410 calls module GMARCVMQ 530. Upon being called, module GMARCVMQ 530 sets the appropriate return block fields based on the header of the message, sends archive and trace messages if applicable (see 450, 476, 481), and returns the message data to the Application 202.

If the retrieved message requires a response, GTAGET 500 provides the receiving Application 202 a reply-to service identifier and reply-to application identifier which is used by the receiving Application 202 when sending the response. This reply-to service identifier enables the messaging architecture to identify the routing required for the response message (through the use of directory 310). In a preferred embodiment, the present invention does not force the receiving Application 202 to generate a reply even if the sending Application 201 has requested one. If the receiving Application 202 does generate a reply message, it can specify a correlation identifier, equal to the unique message identifier of the request message, when sending the response.

As previously described, the present invention provides for two different type of messaging using the MQSeries, native MQ messaging and GTA messaging. Native MQ messaging directly employs the MQSeries with out any additional functionality. GTA messaging provides an additional layer of functionality on top of the functions provided by the MQSeries. GTA Messaging provides a framework within which access to these additional services can be facilitated. A service is a common function provided for applications. For GTA Messaging the types of services provided include, but are not limited to dynamic reformatting of messages, content based routing, persistent archiving, auditing, reconciliation, and multicasting as well as any application specific services. Some of these services are directly provided for in the architecture of the present invention, while access to other services (e.g. vendor provided) is facilitated by the architecture of the present invention.

Figure 8:
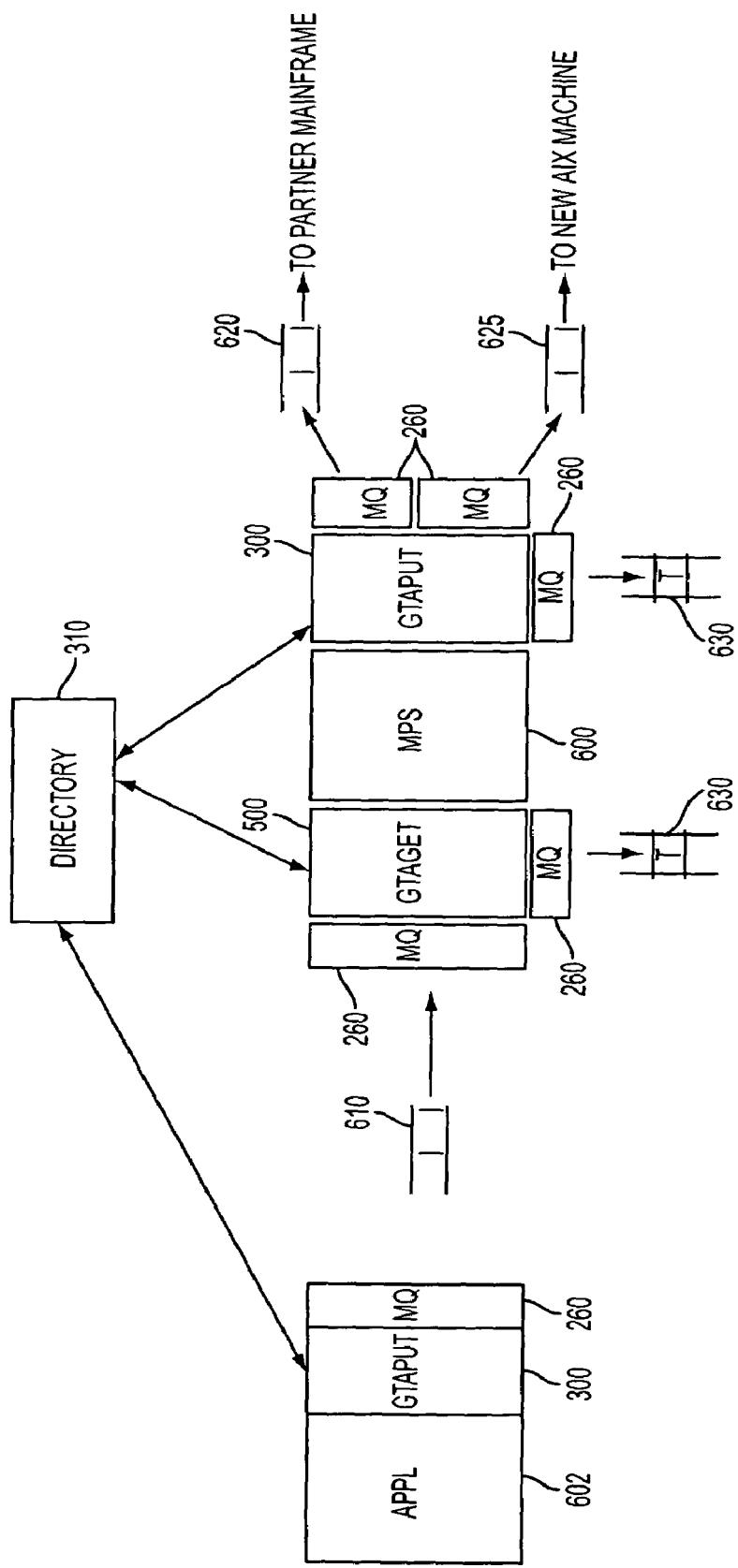
FIG. 8 illustrates the operation of a Message Processing Server according to the present invention.

GTA Messaging according the present invention provides a flexible server based approached to provide additional services to applications. These additional services are performed on the application's message by Message Processing Servers (MPSs). FIG. 8 illustrates the operation of a multicasting MPS 600.

The servers 600 use the previously described APIs GTAPUT 300 and GTAGET 500 for the respective sending and receiving of messages. These APIs 300 and 500 provide both a common message interface for MPS servers 600 and the necessary technical processing to support the message tracing and archiving facilities. In addition, as previously described, the GTA Messaging APIs 300, 500 are configuration driven through the Directory 310 and allow for the servers 600 to be insulated from the technical complexity of message queuing.

An encapsulation function is provided for the use of these servers 600 to pass the context information of a message from the message received 610 to the message(s) sent 620, 625. Context information refers to fields set by a sending application 602 which need to be associated with the messages 620, 625 when they are received by the destination application, e.g. correlation and functional message identifiers.

By providing services to applications within separate MPSs 600, additional services are added for applications by creating new servers 600. If an application wants to take advantage of a new service, e.g. multicasting (as illustrated in FIG. 8 and described below in more detail), the Directory 310 configuration can be changed to route messages to the new MPS 600 which performs the multicasting. Since all servers 600 use the same message queue interface through GTA Messaging (i.e. GTAPUT 300 and GTAGET 500), no changes need to be made to the existing application code.

In the multicasting example depicted in FIG. 8, a mainframe application 602 which is currently messaging to a single partner mainframe application, may require to send the same information 610 to a new application on an AIX machine. By using GTA Messaging, the configuration information in Directory 310 is updated such that the application 602 sends the message 610 (via GTAPUT 300 and MQSeries 260) to multicast MPS 600 which sends one copy of the message 620 to the existing mainframe application and another copy of the message 625 to the new AIX application. The multicasting MPS 600 uses GTAGET and GTAPUT as previously described in order to receive the message 610 and send the messages 620 and 630. The actual implementation of the multicasting MPS 600 can be accomplished in a number of ways. For example, a two different Directories 310 can be established, one for gets and one for puts. In this embodiment, a single service identifier can be used by GTAGET 500 to retrieve the single message. In retrieving the single message, the GTAGET Directory 310 entries for the single service identifier also retrieves two service identifiers which are used by GTAPUT 300 to retrieve the transport details for the two separate messages which are to be sent. Alternatively, the GTAGET 500 can retrieve a single service identifier which is used by GTAPUT 300 to simultaneously retrieve all of the transport details for the two messages. In an alternative embodiment, as depicted in FIG. 8, both GTAGET 500 and GTAPUT 300 share a single Directory 310.

Furthermore, if the new application required a different format message from the existing message being sent, the message sent to AIX could first be sent through the reformatting engine in a different MPS (not shown in FIG. 8) and then forwarded on to the new AIX application. FIG. 8 additionally shows trace records 630 being recorded for each transmission of a message by MQSeries 260.

In this example, no changes are required to any of the applications (602 or the partner application or the new AIX application) since all of the necessary routing information is maintained within the Directory 310 and all of the necessary message processing (i.e. multicasting and reformatting) is performed by servers 600 within GTA Messaging. The only application development required would be the reformatting rules to get from the message format of the mainframe to that of the new AIX application.

As mentioned earlier, the GTA Messaging APIs GTAPUT 300 and GTAGET 500 provide message routing configured by a Directory 310. The directory lookups are based on the application calling the API and the parameters passed. For example, within a GTAPUT 300 call, the entries in Directory 310 controls message processing such as: the immediate destination of the message which can be either a partner application or an intermediary messaging service; Tracing and Reconciliation in which trace messages are be sent within the APIs to a central reconciliation facility to enable tracing the path of an application's message; and Archiving in which exact copies of the message being sent can be forwarded to an archiving location where it can be offloaded and stored.

The Directory 310 entries accessed by GTAGET 500 provide similar configuration. Instead of the destination, the Directory 310 entries for GTAGET 500 controls the location from which the message is to be retrieved (e.g. which queue) as well as a time-out value. Archiving and tracing is also configurable, although the message archived is the message received and the trace message may contain slightly different information.

An MPS 600 either performs application services to the message itself, e.g. reformatting, or can be used to track important operational and statistical information on behalf of the application, e.g. reconciliation and tracing.

As described above, MPS servers 600 use GTA Messaging (e.g. GTAPUT 300 and GTAGET 500) as a common interface. Through configuration within the GTA Directory 310, messages can be routed to any MPS 600 to provide its service for an application. With this approach, additional functionality can be added transparently to messaging applications by adding configuration entries in the Directory 310 to route messages to the appropriate MPS 600. This architecture of the present invention facilitates a phased approach to developing functionality within separate MPS servers 600, allowing services to be developed as they are required by applications.

By using the GTA Messaging APIs (e.g. GTAPUT 300 and GTAGET 500), MPS servers 600 have a common messaging interface and all of the processing available within the GTA Messaging APIs. Of particular value are the archiving and tracing functions. Through configuration via the Directory 310, the GTA Messaging APIs are able send additional archive and trace messages. Archiving of the messages retrieved and sent by a particular MPS server 600 helps facilitate testing and debugging. Enabling tracing at an MPS server 600 helps troubleshooting and determining the status of an in-flight message.

In addition to the above described multicasting service, other services provided by MPSs 600 include but are not limited to dynamic message reformatting, dynamic content based routing, archiving (storage of copies of messages sent or received), tracing and reconciliation (detecting if messages sent are not delivered in a timely fashion), and providing statistical information based on the message trace and audit records. Any messaging service which multiple applications share would be well suited to being implemented as an MPS 600. The architecture of using an MPS 600 of the present invention provides system developers/administrators with significant flexibility previously unknown. The buy/build decisions constantly faced by such people is rendered less daunting as vendor products are more easily bound into the architecture primarily due to the use of Directories 310 by the present invention. The vast majority of the details required to interface with a vendor product are simply coded into the Directories 310 with little change required to existing applications. As the vendor product is upgraded, typically only changes are required to the Directories 310 and not to the applications which use the vendor product.

In a preferred embodiment, a Message Storage MPS incorporates a Relational Database Management System (RDBMS) schema to store messages. A Message Store MPS is used for retrieving archive messages sent from within the GTA Messaging APIs and uploading them to the RDBMS.

Archiving is a service performed by an Message Storage MPS which allows the resending or replaying of messages. Resending of a message entails reissuing a GTAPUT 300 call for a message already successfully sent such that any services applied to the first message (e.g. multicasting and reformatting) will be reapplied to the archive copy of the message. This allows for messages sent to be easily reprocessed if an error occurred downstream of the GTAPUT 300. For example, if the reformatting rules were incorrect and a message needed to be passed through the reformatting engine (another MPS) again the message could be resent from the archives to the reformatting MPS and reprocessed.

Archiving occurring at the GTAGET 500 allows for messages to be redelivered or replayed to the receiving application. In this case, the message is not reprocessed by the architecture and is delivered in the same manner as the original message received by the application. This allows for an application which had an error, to rollback its processing and reprocess previously received data. This facility is useful in environments where the same data needs to be reprocessed, e.g. testing a development application or server.

The storage of the messages can be configured based on application requirements. By enabling archiving within the GTA Messaging API Directories 312, a copy of the message processed by the API will be sent to an archive queue. The Message Store MPS provides a mechanism to offload messages from this archive queue. This allows access to both architecture and application components of the message including portions of the message headers, and the entire application data. The information stored is at a minimum the amount necessary to retransmit the message from the archives. The use of an RDBMS structure for the storage of messages allows for applying existing querying tools to a message store database.

In an alternative embodiment, applications which are unwilling or unable to invest in an RDBMS storage facility for messages may keep messages on the local archive queue and replay/resend them using a provided GUI queue utility. The number of messages stored on the queue is limited by the application's system DASD restrictions.

Message tracing and reconciliation are two important services which can be performed by an MPS. To support reconciliation and tracing, the GTA Messaging API is configured to send trace messages which detail the message which was processed as well as information about where it came from and where it is destined for. A Message Tracing MPS retrieves these messages and uploads them to a Message Tracing RDBMS.

The schema of the Message Tracing RDBMS is such that reconciliation can be performed to check if a message sent by an application is still being processed by the architecture and how long it has been "in-flight". The same schema also allows tracing the path a given message took and the services which were performed on it.

The trace messages sent to a Reconciliation MPS can still be examined after a message has been successfully reconciled as they are not purged. Queries may be run against the Message Tracing RDBMS using standard Structured Query Language (SQL). These queries can identify the end-to-end path of any message with tracing enabled since all of the individual traces of the message are associated together by a unique identifier.

Reconciliation within the present architecture detects if messages are dropped by the messaging architecture and also detects if an application does not receive messages that have been sent. In one embodiment, reconciliation can further determine if the message has been received in an "acceptable" amount of time. If not, reconciliation can alert the sending application that the message has not been received. Reconciliation does not examine application data content and does not provide application end of day counts of messages processed. Instead, the reconciliation function determines which messages have been reconciled and when they were reconciled. As described above, based on the application sending the message and the services it requested, the GTA messaging architecture can determine which messages have been outstanding too long and can send architecture messages to indicate that there is an error to be remedied.

These architecture messages are handled in a default manner by most applications. Special handlers process the trace and archive messages and can, if desired, perform actions such as sending alerts and writing logfiles. Applications requiring specific processing can have these architecture messages forwarded to any queue and process them with a custom handler.

To perform statistical auditing, the trace information stored within the Message Tracing RDBMS can be summarized and stored in historical tables to support statistical auditing. Applications using an RDBMS for archiving can also summarize message statistics such as message length.

These tables can then be queried using report and analysis tools to provide sophisticated performance and messaging usage reports.

Reformatting is an ideal service which can be performed by an MPS. Reformatting is a process by which a message is converted from one format (e.g. a mainframe format) to a different format (e.g. AIX). A Reformatting MPS allows messages to be processed by dynamic content based reformatting rules defined by applications. A Reformatting MPS using GTA Messaging APIs supports reformatting a single message into one or more output messages while passing the context information of the first message.

Dynamic reformatting is an important component of the present architecture as a whole. It facilitates application isolation and allows messaging partners to pass messages without knowing the specific message format requirements of each other. These message formats are preferably stored in a repository in a Reformatting MPS and updated outside of the application's code when one of the messaging partners changes its message format.

Content Based Routing is another important service provided by an MPS. Such an MPS allows applications to define routing rules based upon the content of message. By defining in the Content Based Routing MPS the format of the input message, applications could place specific routing information within the data fields contained in the message.

Figure 9:
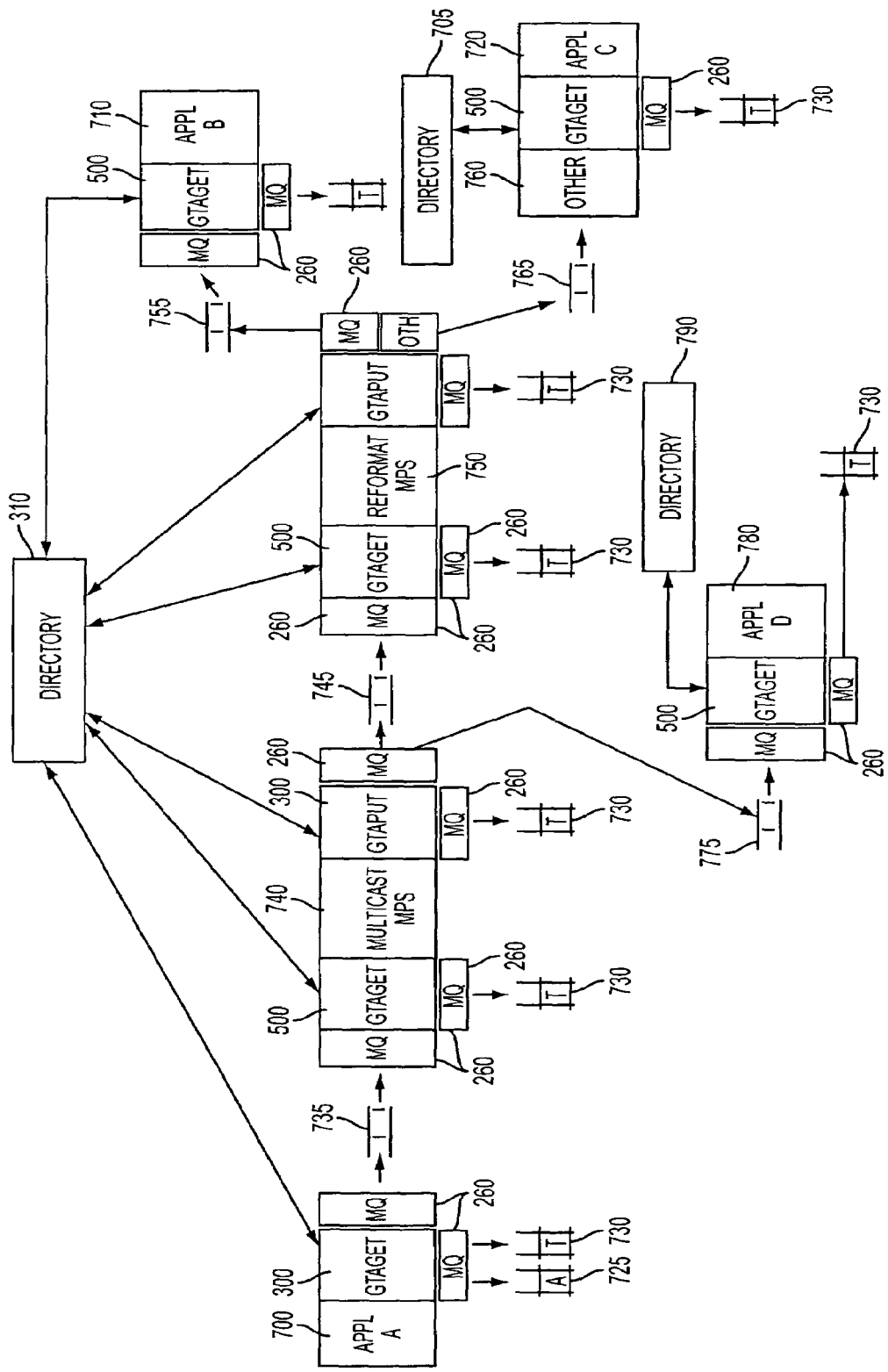
FIG. 9 depicts an end to end example of a messaging operation of the present invention.

FIG. 9 illustrates an end to end example of a messaging operation according to the present invention. In this example, Application A 700 has a need to send a message to three other applications, Application B 710, Application C 720 and Application D 780. In order to accomplish this messaging, Application A 700 calls GTAPUT 300 as described above. The call to GTAPUT 300 is made with a service identifier which is used by GTAPUT 300 to retrieve from Directory 310 the details required to send the message to each of Applications B, C and D, 710, 720, 780. In this particular example, the Directory 310 will point to the multicast MPS 740 as the next destination. With this destination in hand, the message is passed to MQSeries 260 which sends the single message 735 to the MQseries destination queue connected to the multicast MPS 740. Additionally, the record associated with the service identifier in Directory 310 indicates that archive 725 and trace 735 records should be generated for this message.

The multicast MPS 740 uses GTAGET 500 to retrieve the incoming message 735 from the MQSeries 260 message queue. As described above, the arrival of the message 735 is triggered to the MPS 740, or the MPS 740 actively polls MQSeries 260 in order to see if any new messages have arrived. Using the service identifier contained in the message 735, Multicast MPS 740 calls GTAPUT 300 which in turn does a look up in Directory 310. The Directory 310 entry associated with the service identifier indicates that the message has to be sent to the three applications B, C and D, 710, 720, 780. Since the message needs to reformatted prior to being delivered to applications B, 710, and C, 720, the routing details contained in Directory 310 with respect to these destination applications accordingly point to the reformatting MPS 750.

With respect to the sending of the message to application D, 780, GTAPUT 300 calls MQSeries 260 which sends message 775 to the MQSeries 260 connected to Application D, 780. As previously described, application D, 780 calls GTAGET 500 using directory 790 in order to retrieve message 775 from the MQSeries 260. The message 775 is essentially an exact copy of the message 735 originally sent by the sending application 700 since the message did not have to go through any reformatting.

With respect to the transmission of the message to applications B and C, 710, 720, MQSeries 260 is invoked by the multicast MPS 740 through GTAPUT 300 (using directory 310) and a message 745 is sent to the destination queue in the MQSeries 260 attached to the reformatting MPS 750. In this embodiment depicted in FIG. 9, the directory in reformatting MPS 750 is configured such that the service identifier specified in the message 745 will cause the reformatting MPS 750 to reformat the single incoming message twice, once for application B 710 and once for application C 720. In an alternative embodiment, multicast MPS 740 can send two separate messages to reformatting MPS 750, one containing a service identifier for application B, 710, and a separate message containing a service identifier associated with application C 720.

Reformatting MPS 750 calls GTAGET 500 to retrieve the incoming message 745 from the MQSeries 260 queue. Using instructions found in a control block passed through from the original message 735 from application A 700, the reformatting MPS 750 knows the format(s) in which the message should be formatted as required by applications B, 710, and C, 720. In a preferred embodiment, a single reformatting MPS 750 is capable of performing reformatting operations into several different formats. In the example depicted in FIG. 9, Application B 710 could require that the message appear in one format while Application C 720 requires the message in a totally different format.

After the reformatting MPS 750 has formatted the message for each of the formats required by Application B 710 and Application C 720, it calls GTAPUT 300 in order to actually transmit the messages. As previously described, MPS 750 can make two separate calls to GTAPUT 300, each one with the appropriate service identifier required to send the message respectively to Applications B, 710, and C, 720. Alternatively, a single service identifier in Directory 310 can be used by MPS 750 (through GTAPUT 300) which simultaneously identifies the destinations as Applications B, 710, and C, 720 Again, using the lookup in Directory 310, GTAPUT 300 retrieves the parameters required to be passed to the transport layer to actually transmit the messages 755, 765.

In FIG. 9, the message 755 destined for Application B 710 is transmitted using the MQSeries 260. In contrast, the transport layer 760 which transmits the message 765 destined for Application C 720 has been designated as OTHER. This designation is to indicate that the architecture of the present invention can be customized to accommodate any reasonable transport layer.

Once the messages 755, 765 reach the input queues of the transport layers attached to the respective Applications B 710 and C 720, the applications 710 and 720 call GTAGET 500 in order to retrieve the messages.

As briefly described above, the GTA messaging architecture of the present invention supports the transmittal of blocks of messages. Block messaging refers to a set of messages which are delivered in the same order they were sent with no messages interspersed which do not belong to the block. This function is not support by native MQ messaging. Applications requiring the use of native MQ messaging will not have the ability to send and retrieve blocks of native MQ messages.

In one embodiment of the present invention, denoted as block single, the messages belonging to the block are internally blocked together into a single MQSeries message. The block may be named with an identifier provided by the sending application. This identifier may be for descriptive purposes only, i.e. a functional identifier, or may be used to by the receiving application to retrieve a specific block of messages from its input queue by using a correlation identifier. In an alternative embodiment, denoted as block multiple, a block is broken up into several MQSeries messages. In this embodiment, a copy of the message ID of the first message in the block is copied into the correlation ID of the subsequent MQSeries messages forming the block. When sending messages, it is the responsibility of the sending application to identify that it is sending a block of messages. It must identify which is the first message of the block, the last message of the block, and send the messages in the sequence they should be received. The sending application does not have to provide a meaningful identifier to tie the block together.

In the block single embodiment, the architecture does not send the block of messages to the queue until all of the messages belonging to the block have been supplied by the application. When the last message of the block is provided, the architecture creates a single infrastructure message which it sends to the queue. All block messaging must be committed within a logical unit of work. If a message belonging to the block can not be sent to the GTA messaging architecture, the entire message should be rolled back.

When receiving messages, an application is informed whether or not the message is the beginning of a block. This is provided for informational purposes so that the application can initiate the appropriate application processing. Subsequent GTAGETs 500 will return the messages to the receiving application in the same order they were put. It is transparent to the receiving application whether the individual messages are being retrieved from an MQSeries queue or are segments of a larger block message.

Although the present invention has been described in relation to particular embodiments thereof, many other variations and other uses will be apparent to those skilled in the art. It is preferred, therefore, that the present invention be limited not by the specific disclosure herein, but only by the gist and scope of the disclosure.

I claim:

1. A computer implemented method of conveying a message from a first application to at least a second application using a transport infrastructure, the method comprising the steps of:

generating a first service identifier associated with the second application;

retrieving a first set of parameters from a first directory using the first service identifier, the first set of parameters being required by the transport infrastructure to transmit the message from the first application to the second application; and passing the message and the retrieved first set of parameters to the transport infrastructure, wherein the transport infrastructure conveys the message to the second application;

triggering the second application upon arrival of the message;

generating a second service identifier;

retrieving a second set of parameters from a second directory using the second service identifier; and retrieving the message from the transport infrastructure using at least some of the retrieved second set of parameters.

2. The method according to claim 1, wherein the first directory is the second directory.

3. The method according to claim 1, wherein the message is conveyed asynchronously with respect to the operation of the first application.

4. The method according to claim 1, further comprising the step of updating the first directory.

5. The method according to claim 4, wherein the updating of the first directory is in response to a change with respect to the second application and wherein the updating of the first directory and the change with respect to the second application do not necessitate any modification to the first application.

6. The method according to claim 5, wherein the change with respect to the second application is a change in location of the second application.

7. The method according to claim 5, wherein the change with respect to the second application is a change in a platform on which the second application runs.

8. The method according to claim 5, wherein the updating of the first directory is in response to a change with respect to transport infrastructure and wherein the updating of the first directory and the change with respect to the transport infrastructure do not necessitate any modification to the first application.

9. The method according to claim 8, wherein the change with respect to transport infrastructure is a change with respect to a physical configuration of the transport infrastructure.

10. The method according to claim 8, wherein the change with respect to transport infrastructure is a change with respect to an interface of the transport infrastructure.

11. The method according to claim 8, wherein the change with respect to transport infrastructure is a change with respect to a software component of the transport infrastructure.

12. The method according to claim 8, wherein the change with respect to transport infrastructure is a change with respect to a message routing used by the transport infrastructure.

13. The method according to claim 4, wherein the updating of the first directory is in response to a change in default settings contained in the first directory.

14. The method according to claim 13, wherein the change in default settings reflects a change in the desired operation of the transport infrastructure.

15. The method according to claim 14, wherein the change in the desired operation of the transport infrastructure is a change in priority of messages to be conveyed.

16. The method according to claim 1, wherein the first set of parameters includes routing information with respect to the second application.

17. The method according to claim 1, wherein the retrieving step further comprises the step of using the first service identifier to perform a look-up in the first directory in order to retrieve the first set of parameters from the first directory.

18. The method according to claim 1, wherein the first directory includes a plurality of sets of parameters and wherein the retrieving step further comprises the step of retrieving only the first set of parameters which are associated with the first service identifier.

19. The method according to claim 1, further comprising the step of archiving the message prior to its conveyance to the second application.

20. The method according to claim 1, further comprising the step of tracing a message which has been passed to the transport infrastructure for conveyance.

21. The method according to claim 1, further comprising the step of reconciling messages which have been passed to the transport infrastructure for conveyance.

22. The method according to claim 1, further comprising the step of the first application generating a control block which contains the first service identifier.

23. The method according to claim 22, further comprising the step of the application generating a flag which changes a Logical Unit of Work setting for a conveyed message, the flag being contained in the control block.

24. The method according to claim 22, further comprising the step of the application generating a flag which changes a persistence setting, the flag being contained in the control block.

25. The method according to claim 22, further comprising the step of the application generating a priority indication which increases or decreases a priority of the message, the priority indication being contained in the control block.

26. The method according to claim 22, further comprising the step of the application generating override parameters, the override parameters being contained in the control block and overriding any corresponding ones of the retrieved first set of parameters.

27. The method according to claim 1, further comprising the step of the transport infrastructure conveying the message to an intermediate Message Processing Server (MPS).

28. The method according to claim 27, further comprising the steps of:
triggering the MPS upon arrival of the message;
generating a second service identifier;
retrieving a second set of parameters from a second directory using the second service identifier; and
retrieving the message from the transport infrastructure using at least some of the retrieved second set of parameters.

29. The method according to claim 27, further comprising the step of determining the operation to be performed by the MPS according to the contents of the message.

30. The method according to claim 27, further comprising the step of the MPS performing an operation on the message.

31. The method according to claim 27, wherein the first service identifier is associated with MPS.

32. The method according to claim 27, wherein the message is also to be conveyed to a third application, the method further comprising the steps of:
the MPS retrieving the message from the infrastructure as conveyed from the first application;
the MPS causing the infrastructure to convey the message to both the second application and the third application.

33. The method according to claim 28, further comprising the steps of:
the MPS performing an operation on the retrieved message;
the MPS extracting a third service identifier from the retrieved message;
retrieving a third set of parameters from the second directory using the third service identifier; and
passing the message and the retrieved third set of parameters to the transport infrastructure, wherein the transport infrastructure conveys the message to the second application.

34. The method according to claim 33, wherein the operation performed on the message further comprises the step of reformatting the message.

35. The method according to claim 34, wherein the message is reformatting for a platform on which the second application runs.

36. The method according to claim 32, wherein the MPS causes the infrastructure to convey the message to both the second application and the third application by:
the MPS extracting a second service identifier from the retrieved message;
retrieving a second set of parameters from a second directory using the second service identifier; and
passing the message and the retrieved second set of parameters to the transport infrastructure, wherein the transport infrastructure conveys the message to both the second application and the third application in response to the second set of parameters.

37. The method according to claim 32 wherein the MPS causes the infrastructure to convey the message to both the second application and the third application by:
the MPS extracting a second service identifier from the retrieved message;
retrieving a second set of Parameters and a third set of parameters from a second directory using the second service identifier;
passing the message and the retrieved second set of parameters to the transport infrastructure, wherein the transport infrastructure conveys the message to the second application in response to the second set of parameters; and
passing the message and the retrieved third set of parameters to the transport infrastructure, wherein the transport infrastructure conveys the message to the third application in response to the third set of parameters.

38. The method according to claim 32, wherein the routing of the message is determined based on the content of the message.

39. The method according to claim 32, further comprising the steps of:
triggering the MPS upon arrival of the message;
generating a second service identifier;
retrieving a second set of parameters from a second directory using the second service identifier;
wherein the MPS causes the infrastructure to convey the message to both the second application and the third application by:
the MPS extracting a third service identifier from the retrieved message;
retrieving a third set of parameters from a third directory using the third service identifier; and
passing the message and the retrieved third set of parameters to the transport infrastructure, wherein the transport infrastructure conveys the message to both the second application and the third application in response to the third set of parameters.

40. A system for conveying a message from a first application to at least a second application using a transport infrastructure, the system comprising:
a processor;
a sending module coupled to the first application and the transport infrastructure, the sending module receiving a first service identifier from the first application, the first service identifier being associated with the message and being associated with the second application;
a first directory containing at least a first set of parameters, the first set of parameters being required by the transport infrastructure to transmit the message from the first application to the second application, the sending module retrieving the first set of parameters from the first directory in response to receipt of the first service identifier, wherein the sending module passes the retrieved first set of parameters to the transport infrastructure and the transport infrastructure conveys the message to the second application, and wherein the first application is ignorant of the contents of the first set of parameters;
  a receiving module coupled to the second application and the transport infrastructure, the receiving module receiving a second service identifier from the second application; and
  a second directory containing at least a second set of parameters, the second set of parameters being required to retrieve the message from the transport infrastructure, wherein the receiving module retrieves the second set of parameters from the second directory in response to receipt of the second service identifier and wherein the receiving module retrieves the message from the transport infrastructure using at least some of the retrieved second set of parameters.

41. The system according to claim 40, wherein the first directory is the second directory.

42. The system according to claim 40, wherein the message is conveyed asynchronously with respect to the operation of the first application.

43. The system according to claim 40, further comprising a plurality of sets of parameters contained in the first directory.

44. The system according to claim 43, wherein the sets of parameters are default parameters required for the operation of the transport infrastructure.

45. The system according to claim 40, further comprising updates to the first directory.

46. The system according to claim 45, wherein the updates reflect a change with respect to the second application and wherein the updates do not necessitate any modification to the first application.

47. The system according to claim 46, wherein the change with respect to the second application is a change in location of the second application.

48. The system according to claim 46, wherein the change with respect to the second application is a change in a platform on which the second application runs.

49. The system according to claim 45, wherein the updates modify default settings contained in the first directory.

50. The system according to claim 49, wherein the updates reflect a change in the desired operation of the transport infrastructure.

51. The system according to claim 50, wherein the change in the desired operation of the transport infrastructure is a change in priority of messages to be conveyed.

52. The system according to claim 45, wherein the updates reflect a change in the transport infrastructure and wherein the updates do not necessitate any modification to the first application.

53. The system according to claim 52, further comprising a physical configuration of the transport infrastructure, wherein the change in the transport infrastructure is a change with respect to the physical configuration of the transport infrastructure.

54. The system according to claim 52, further comprising an interface between the sending module and the transport infrastructure, wherein the change in the transport infrastructure is a change with respect to an interface of the transport infrastructure.

55. The system according to claim 52, further comprising a software component in the transport infrastructure, wherein the change with respect to transport infrastructure is a change with respect to the software component of the transport infrastructure.

56. The system according to claim 52, wherein the change with respect to transport infrastructure is a change with respect to a message routing used by the transport infrastructure.

57. The system according to claim 40, wherein the first set of parameters comprises routing information with respect to the second application.

58. The system according to claim 40, further comprising an archiving module that archives the message.

59. The system according to claim 40, further comprising a tracing module that traces a message which has been passed to the transport infrastructure for conveyance.

60. The system according to claim 59, further comprising a reconciling module that reconciles messages which have been passed to the transport infrastructure for conveyance.

61. The system according to claim 40, further comprising a control block generated by the first application, the control block containing the first service identifier.

62. The system according to claim 61, further comprising a flag generated by the first application, the flag changing a Logical Unit of Work setting for a conveyed message, the flag being contained in the control block.

63. The system according to claim 61, further comprising a flag generated by the first application, the flag changing a persistence setting, the flag being contained in the control block.

64. The system according to claim 61, further comprising a priority indication generated by the first application, the priority indication increasing or decreasing a priority of the message, the priority indication being contained in the control block.

65. The system according to claim 61, further comprising override parameters generated by the first application, the override parameters being contained in the control block and overriding any corresponding ones of the retrieved first set of parameters.

66. The system according to claim 40, further comprising a Message Processing Server (MPS) coupled to the transport infrastructure.

67. The system according to claim 66, wherein the first service identifier is associated with MPS.

68. The system according to claim 66, wherein the message is conveyed by the transport infrastructure to the MPS and wherein the MPS performs an operation on the message.

69. The system according to claim 68, wherein the MPS determines the operation to be performed according to the contents of the message.

70. The system according to claim 66, further comprising:
  a MPS receiving module coupled to the MPS and coupled to the transport infrastructure, the receiving module receiving a second service identifier from the MPS; and
  a second directory containing at least a second set of parameters, the second set of parameters being required to retrieve the message from the transport infrastructure, wherein the MPS receiving module retrieves the second set of parameters from the second directory in response to receipt of the second service identifier and wherein the MPS receiving module retrieves the message from the transport infrastructure using at least some of the retrieved second set of parameters.

71. The system according to claim 70, further comprising a routing module dispose in the MPS that determines the routing of the message based on the contents of the message.

72. The system according to claim 71, further comprising a reformatting engine contained in the MPS, wherein the operation performed on the message further comprises reformatting the message using the reformatting engine.

73. The system according to claim 72, wherein the message is reformatting for a platform on which the second application runs.

74. The system according to claim 66, wherein the message is also to be conveyed to a third application, and wherein the MPS is a multicasting MPS the system further comprising:

A MPS receiving module coupled to the MPS and coupled to the transport infrastructure;

a second directory containing at least a second set of parameters, the second set of parameters being required to retrieve the message from the transport infrastructure, wherein the MPS receiving module retrieves the second set of parameters from the second directory and wherein the MPS receiving module retrieves the message from the transport infrastructure using at least some of the retrieved second set of parameters; and an MPS sending module coupled to the MPS, coupled to the second directory and coupled to the transport infrastructure, the sending module retrieving a third set of parameters from the second directory;

wherein the MPS sending module passes the retrieved third set of parameters to the transport infrastructure and the transport infrastructure conveys the message to the second application and to the third application.

* * * * *